United States Patent Office 3,413,213
Patented Nov. 26, 1968

3,413,213
REFORMING WITH A PLATINUM, HALOGEN, ALUMINA, SULFUR AND IRON CATALYST
John C. Hayes, Palatine, Ill., assignor to Universal Oil Products Company, Des Plaines, Ill., a corporation of Delaware
No Drawing. Filed Oct. 3, 1966, Ser. No. 583,962
9 Claims. (Cl. 208—139)

ABSTRACT OF THE DISCLOSURE

Process for reforming a gasoline charge stock by contacting the charge stock, in admixture with hydrogen and at reforming conditions, with a sulfided Pt-Fe-halogen-$Al_2O_3$ catalyst, the iron concentration of the catalyst being 50–5000 p.p.m. and the iron being uniformly distributed throughout the alumina support.

---

The subject of the present invention is an improved process for reforming a hydrocarbon charge stock. More precisely, the present invention is concerned with a process for reforming a hydrocarbon charge stock which consistently exhibits a performance stability which, in view of the extensive development of the art in this area, must be regarded as quite significant. In the main, the conception of the present invention stems from the recognition that controlled amounts of iron, when uniformly dispersed in an alumina carrier material having a halogen component, a platinum group component, and a sulfur component composited therewith, has a remarkable capability to impart a stabilizing effect to a reforming process utilizing this catalytic composite. In essence, then, the present invention involves the use of a catalytic composite, containing a uniform distribution of a controlled concentration of iron, in a reforming process whereby improved stability, both in the area of selectivity and activity, is effected.

It is well known in the art that the requirements for an optimum process for transforming low octane stocks into high octane stocks, at minimum loss to undesirable products, involves a specially tailored catalytic environment that is designed to promote upgrading reactions for paraffins and naphthenes, which are the components of gasolines and naphthas that have the highest octane-improving potential. For paraffins the upgrading reactions are: isomerization, dehydrogenation to olefins, dehydrocyclinization to aromatics, and hydrocracking to lower molecular weight parafins. Of these the dehydrocyclization reaction is the one that shows the maximum gain in octane number and is, consequently, preferred. For naphthenes, the principal upgrading reactions involve dehydrogenation and ring isomerization of naphthenes to aromatics; but the improvement in octane number is not as dramatic here as in the case of dehydrocyclization of paraffins since the clear research octane number of most naphthenes is in the range of 65 to 80. Accordingly, catalytic reforming operations are designed to provide an optimum mix between the aforementioned reactions, generally employing for this purpose a multi-functional catalytic composite having at least a metallic dehydrogenation component and an acid-acting component.

It is not, however, to be assumed that the achievement and control of this optimum mix of upgrading reactions is without its problem areas. These, as is true with any complex set of reaction mechanisms, are injected into the picture by the ever present side phenomena, such as carbonaceous deposit formation, yield losses, activity decline, etc., that are produced by a myriad of factors that color and complicate the actual operations of such a reforming process. Foremost among these complicating factors are those associated with undesired side reactions. Examples of these side reactions are: demethylation of hydrocarbons to produce methane, ring opening of naphthenes to give straight chain hydrocarbons, excessive hydrocracking to yield light gases (i.e. $C_1$ to $C_4$), condensation of aromatics and other components to form carbonaceous deposits on the catalyst, acid-catalyzed polymerization of olefins and other highly reactive components to yield high molecular weight reactants that can undergo further dehydrogenation and thus contribute to the carbonaceous deposits on the catalyst, etc.

These side reactions contribute to process instability in a number of ways. First, pentane and heavier hydrocarbon ($C_5$+) yield is decreased by the demethylation and excessive hydrocracking reaction since the products of these reactions are typically produced at the expense of the $C_5$+ yield fraction. Second, demethylation and excessive hydrocracking are strongly exothermic and thus contribute to temperature control problems. Third, ring opening of cyclic hydrocarbons replaces a reasonably high octane compound with one of an inferior rating thereby placing an additional burden on the process to make these octane losses good via, principally, the dehydrocyclization route which ultimately leads to higher reaction temperatures in order to promote this reaction. Finally, the carbonaceous deposit formation reactions not only form these deposits at the expense of the $C_5$+ yield; but, more significantly, they cause temperature instability since these deposits settle on the active sites of the catalysts thereby blocking access of the reactants to these sites. Consequently, the remaining active sites have to "work harder" at producing the desired upgrading reaction and this requires correspondingly higher temperatures which in general also promote additional hydrocracking with its detrimental impact on $C_5$+ yield.

Accordingly, a central objective in the reforming art is to seek means to inhibit or prevent these side reactions and, thus, achieve greater process stability.

In a large measure, the search for solutions to the stability problems associated with reforming process has been concentrated in the areas of variation of components and concentrations thereof of the catalytic composite, of methods for manufacturing and treating the catalytic composite prior to use, of kind and concentration of elements contained in the reaction environment, of magnitude of the dependent process conditions, and of types of process flow. It is, indeed, evident from even a cursory perusal of the substantial volume of literature associated with the reforming art that each of these avenues to the solutions of the aforementioned problems has been pursued with considerable vigor. The consensus of the art in the area of catalytic composite is perhaps fairly summarized—at least in the area of nonregenerable or infrequently regenerable processes—as being in favor of a platinum and halogen-containing alumina catalyst. Consistent with its commercial success, this catalyst has been subjected to all of the previously mentioned parameter variation studies. These studies have, indeed, shown how substantial improvements can be made in the use of this composite; moreover, they have been so exhaustive in nature that a substantial improvement in reforming with this type of catalyst no longer necessarily implies—for example a 10% increase in yield, or a 25% increase in catalyst life. Rather, a substantial improvement in reforming today is represented by small increases in the performance characteristics of the process, which because of its widespread use, are multiplied by substantial volume factors in determining their ultimate economic impact and value.

I have now discovered that by the controlled incorporation of iron and sulfur in the aforementioned platinumhalogen-alumina catalyst, a significant increase in selectivity-stability and activity-stability can be achieved, as will be shown in an example, without materially sacrificing other desired operating characteristics of this preferred catalytic composite.

It is, accordingly, an object of the present invention to provide a reforming process which has improved stability characteristics. A corollary objective is to provide a reforming process with an improved catalyst life before regeneration becomes necessary.

In one embodiment, the present invention relates to a process for reforming a hydrocarbon charge stock which comprises contacting said charge stock and hydrogen with a catalytic composite containing a platinum group metallic component, a halogen component, an alumina component, a sulfur component, and an iron component at reforming conditions; said catalytic composite being further characterized in that it is prepared from purified alumina containing less than 20 p.p.m. of iron, in that an iron-containing compound is added in an amount such that the final composite contains about 50 p.p.m. to about 5000 p.p.m. by weight of iron, and in that said sulfur component is present in an amount of about 0.05% to about 0.5% by weight.

Specific embodiments of the present invention relate to particularly preferred catalyst manufacturing procedures, concentration of catalytic components, process conditions and mechanisms of effecting the process of the present invention as will be hereinafter discussed in detail.

It is not completely understood why the present invention exhibits the improved stability characteristics; however, without the intension of limiting my invention thereby, I believe that this stability improvement is primarily caused by the action of iron and sulfur on the previously mentioned catalyst-fouling reactions of condensation and polymerization. The action of the iron and sulfur on these reactions is primarily one of inhibition such that the rate of carbonaceous deposit on the catalyst is reduced and, consequently, the stability of the catalyst is improved. Furthermore, I believe that the primary inhibition effect flows from the sulfur and the function of the iron is at least in part to fix and hold the sulfur in the catalyst.

Before considering in detail the various ramifications of the present invention, it is convenient to define several of the conventions, terms, and phrases used in the specification and in the appended claims. In those instances where temperatures are associated with boiling ranges and boiling points, it is understood that they have reference to those which are obtained through the use of Standard ASTM distillation methods. The phrase "gasoline boiling range" as used herein refers to a temperature range having an upper limit of about 400° F. to about 425° F. The term "naphtha" refers to a selected fraction of a gasoline boiling range distillate and will generally have an initial boiling point of from about 150° F. to about 250° F. and an end boiling point within the range of about 350° F. to about 425° F. The phrase "hydrocarbon charge stock" is intended to refer to a portion of a petroleum crude oil, a mixture of hydrocarbons, a coal tar distillate, a shale oil, etc., that boils within a given temperature range. The term "selectivity" when it is applied to a reforming operation refers to the ability of the process to promote favored octane-improving reactions and to inhibit undesired reactions. The term "activity" when it is applied to reforming operation refers to the relative ability of the process at specified conditions to produce a product of the required quality as measured by octane number. The term "stability," when it is applied to the reforming process, refers to the rate of change of the operating parameters associated with the process; for instance, a common measure of stability is the rate of change of reactor temperature that is required to maintain a given quality in output product—the smaller slope implying the more stable process. The phrase "platinum group metallic component" embraces all the members of Group VIII of the Periodic Table having an atomic weight greater than 100, as well as compounds and mixtures of any of these. The "liquid hourly space velocity" is defined to be the equivalent liquid volume of the charge to the reactor per hour divided by the volume of catalyst disposed within the reaction zone. The catalytic elements of interest to the present invention may exist within the final catalytic composite in any form—combined or uncombined; nevertheless, they are referred to within the specification and claims as if they were present in the elemental state—for example, the term "iron" is used herein to denote both iron in the elemental state and iron in any combined form such as iron sulfide. In addition, the concentration of these elements in the catalytic composite are reported herein on an elemental basis even though they may exist within the composite in some combined form.

The hydrocarbon charge stocks that can be converted in accordance with the process of the present invention comprise hydrocarbon fractions containing naphthenes and paraffins. The preferred stocks are those consisting essentially of naphthenes and paraffins although in some cases aromatics and/or olefins may also be present. This preferred class includes straight run gasolines, natural gasolines, and the like. On the other hand, it is frequently advantageous to charge thermally or catalytically cracked gasolines or higher boiling fractions thereof to the reforming process of the present invention. Mixtures of straight run and cracked gasoline can also be used. The gasoline charge stock may be a full boiling range gasoline or may be a selected fraction thereof which usually will be a higher boiling fraction commonly referred to as a heavy naphtha. It is also possible to charge to the process of the present invention pure hydrocarbons or mixtures of hydrocarbons, usually paraffins or naphthenes, which it is desired to convert to aromatics.

As hereinabove set forth, the present invention encompasses utilization of a catalytic composite which contains alumina. In the present specification and appended claims, the term "alumina" is employed to mean porous aluminum oxide in all states of oxidation and in all states of hydration, as well as aluminum hydroxide. The alumina may be activated prior to use by one or more treatments including drying, calcining, steaming, etc.

The alumina may be prepared by adding a suitable alkaline reagent such as ammonium hydroxide to a salt of aluminum such as aluminum chloride, aluminium nitrate, etc., in an amount to form aluminum hydroxide which, upon drying and calcination, is converted to alumina. Alumina may also be prepared by the reaction of sodium aluminate with a suitable acidic reagent to cause precipitation thereof with the resultant formation of aluminum hydroxide gel. Synthetic aluminas may also be prepared by the reaction of metallic aluminum with hydrochloric acid, acetic acid, etc., in order to form a hydrosol which sols can be gelled with a suitable precipitating agent, such as ammonium hydroxide, followed by drying and calcination. The alumina may be formed into any desired shape such as spheres, pills, extrudates, powder, granules, etc. A preferred form of alumina is the sphere, and alumina spheres may be continuously manufactured, as detailed in U.S. Patent No. 2,620,314, by passing droplets of an alumina hydrosol into an oil bath, by means of a nozzle or rotating disk, maintained at an elevated temperature, the droplets being retained in said oil bath until they set to form hydrogel spheroids. The spheres are continuously withdrawn from the oil bath and immediately thereafter subjected to specific aging treatments, in an ammoniacal solution, to impart certain desired physical characeristics hereto. Following a drying procedure, at a temperature of about 200° F., to remove the greater proportion of excess moisture therefrom, the spheres are typically subjected to a calcination procedure. The dried alumina is preferably calcined initially at a temperature of from about 850° F. to about 1050° F. for a period of at least about one hour, and thereafter at an elevated temperature of about 1100° F. to about 1400° F. and for a time sufficient to decrease the volatile matter content of the calcined alumina to a level below about 2.0% by weight.

It is a feature of the present invention that the alumina be substantially free of foreign contaminants—paricularly iron oxide—prior to its use in the process of the present invention. This requirements is generated by the necessity of carefully controlling the concentration and especially the distribution of the iron in the resultant catalytic composite. While it is feasible to adjust the contaminant iron concentration in order to yield the desired iron concentration and distribution such a procedure is not practical because of analytic control difficulties associated with obtaining the desired concentration of iron in the required uniform distribution and because it has been found that the process of removing the contaminate iron also serves to remove other contaminants. Consequently, it is necessary that the alumina component contain less than 20 p.p.m. of contaminating iron and preferably less than 10 p.p.m. In gentral, this purity requirement can be achieved by use of high purity reactants or by magnetic purification during alumina synthesis such as by use of magnetic dross collectors.

The iron component of the catalyst associated with the present invention can be composited with the alumina component in any suitable manner designed to achieve a uniform distribution of iron throughout the alumina. It is generally preferred to commingle an iron-containing compound with the aluminum salt or the alumina hydrosol prior to the formation of the alumina particles in order to insure a uniform distribution of the iron throughout the alumina carrier material. Any suitable iron-containing compound can be utilized; but it is generally preferable to utilize an iron salt such as: iron chloride, iron bromide, iron acetate, iron fluoride, iron formate, iron iodide, iron nitrate, etc. Acceptable results can also be obtained by impregnating the alumina carrier material with a solution or colloidal solution, or suspensions of the previously mentioned iron salts since the alumina is readily uniformly penetrated by these solutions. In cases where the iron-containing compound is not soluble in water at the temperature used, other suitable solvents can be utilized such as alcohols, ethers, etc.

I have now found that the method used for incorporating the iron is not essential, provided there is a uniform distribution of the iron throughout the resultant iron-containing composite and there is careful control of the concentration of the iron. Also I have found that improved stability is exhibited by the catalyst when the iron is present in an amount of from 100 p.p.m. to about 5000 p.p.m. based on the weight of the alumina carrier material. At concentration levels greater than this, the increased stability is offset by a tendency toward excessive hydrocracking.

As previously mentioned, the process of the present invention utilizes a catalyst containing a platinum group metallic component. Although the process of the present invention is specifically directed to the use of a catalytic composite containing platinum, it is intended to include other platinum group metals such as palladium, rhodium, ruthenium, osmium, and iridium. Generally, the amount of the platinum group component composited with the catalyst is small compared to the quantities of the other components combined therewith. For example, platinum and/or palladium, or other metals from the platinum group will generally comprise from about 0.01% to about 3.0% by weight of the total catalyst calculated on an elemental basis, and usually from about 0.1% to about 2.0% by weight.

The platinum group component may be incorporated in the catalytic composite in any suitable manner; for example, by impregnation or by coprecipitation with an appropriate platinum group compound, such as chloroplatinic acid, platinum cyanide, platinum hydroxide, palladium chloride, etc. Platinum is the preferred component; and it is generally added to the carrier material by commingling the latter with an aqueous solution of chloroplatinic acid or other water soluble compounds of platinum group metals.

The catalyst for the process of the present invention also contains combined halogen. This combined halogen may be either fluorine, chlorine, iodine, bromine, or mixtures thereof. Of these, fluorine and chlorine are preferred because of their superior compositing characteristics and their ready availability. The halogen may be added to the calcined carrier material in any suitable manner, and either before, during, or after the addition of the other components. The halogen may be added as an aqueous solution of an acid, such as hydrogen fluoride, hydrogen chloride, hydrogen bromide, etc. Another satisfactory source of halogen is the volatile salts, such as ammonium fluoride, ammonium chloride, etc. At least a portion of the halogen may be composited with the alumina during the impregnation of the latter with platinum group component, for example, through the utilization of a mixture of chloroplatinic acid and hydrochloric acid. In any event, the halogen will be composited in such a manner as to result in a final composite that contains about .1% to about 2.0%, and preferably about 0.4% to about 1.5% by weight of halogen calculated on an elemental basis.

After the additional components have been incorporated in the alumina carrier, the resultant composite is typically dried at a temperature of about 200° F. for the purpose of removing the excess water or other solvent remaining from the impregnation procedure. Thereafter, the composite is oxidized, or calcined, initially at a temperature within the range of from about 400° F. to about 600° F. for a period of time of one hour or more. Then the calcination temperature is increased to a level of about 900° F. to about 1200° F. for an additional period of at least one hour. The resultant oxidized composite is then subjected to a treatment procedure involving a reduction step and a sulfiding step.

The reduction step is effected by contacting the oxidized catalytic composite with a stream of hydrogen that is oxygen-free and sulfur-free. This hydrogen can be once-through pure hydrogen or it can be recycle hydrogen that has been suitably scrubbed to a low water concentration by passing the effluent from the reduction zone over high surface area sodium, aluminosilicates, alumina, silica gel, ion-exchange resins, etc. The temperature employed in this step is within the range of about 900° F. to about 1100° F. and preferably about 950° F. to about 1050° F. This reduction can be conducted at any suitable pressure, but it is generally more convenient to perform it at atmospheric. The time of contact of the hydrogen with the catalytic composite varies as a function of the concentration of oxygen combined with the platinum metal; but in general it is at least one hour.

Following the reduction step, the resultant reduced catalytic composite is subjected to a sulfiding step. This consists in the preferred embodiment of contacting the reduced composite with an oxygen-free gas mixture composed of hydrogen and hydrogen sulfide. It is possible to employ gases other than hydrogen as the diluent for the hydrogen, such as nitrogen or other inert gases; but I find that best results are obtained when oxygen-free hydrogen is used. In addition, it is conceivable that a reducible sulfur-containing compound, such as: a mercaptan, a sulfide, disulfide, a heterocyclic sulfur compound, etc., could be utilized to furnish the necessary hydrogen sulfide; but for reasons of convenience it is generally preferred to directly utilize hydrogen sulfide. In any event, the concentration of hydrogen sulfide in the diluent must be carefully controlled to insure the deposition of the requisite amount of sulfur and the uniform distribution of the sulfur throughout the catalyst bed. This concentration, accordingly, must be in the range of about 0.1 to about 2 moles of hydrogen sulfide per 100 moles of hydrogen.

The sulfiding operation can be conducted at any suitable temperature but, in general, it is preferred to conduct it at substantially the same temperature that the reduction operation is performed at—namely, about 900° F. to about 1100° F. Likewise, any suitable pressure can be employed in the execution of this step; but, generally, atmospheric pressure is preferred. Additionally, the time of contact and the sulfiding temperature of the sulfiding gas is adjusted in order to composite from about 0.05% to about 0.50% by weight of sulfur with the reduced catalytic composite.

While the catalyst associated with the present invention is particularly suitable for the reforming of gasoline, it is understood that the catalyst may also find utility in other processes for the conversion of hydrocarbons such as the dehydrogenation of normally gaseous and normally liquid hydrocarbons, cyclization of aliphatic hydrocarbons containing six or more carbon atoms in a straight chain, isomerization reactions, and particularly the isomerization of olefinic, paraffinic, alkyl aromatic and naphthenic hydrocarbons, isomerization of acids, alcohols, ethers, etc., alkyl transfer reactions and hydrogen transfer reactions.

As hereinbefore set forth, this catalyst is particularly suitable for use in the reforming of hydrocarbons and/or fractions thereof boiling within the gasoline boiling range. The reforming operation may be effected at a temperature within the range of from about 800° F. to 1100° F., a pressure within the range of from about 50 to 1000 pounds per square inch or more, and a liquid hourly space velocity of from about 0.2 to 20.0 or more.

The reforming is effected in the presence of hydrogen, and the hydrogen may be introduced from an extraneous source, or recycled from within the process. In a preferred operation, sufficient hydrogen will be produced in the reforming reaction to furnish the hydrogen required in the process, and therefore, it is usually unnecessary to introduce hydrogen from an extraneous source. Furthermore, the amount of hydrogen charged is from about 0.5 to about 20.0 moles of hydrogen per mole of hydrocarbon charge stock.

The process of the present invention may be effected in any suitable equipment, and as a fluidized process, moving bed process or fixed bed process. A particularly suitable process comprises the well known fixed-bed system in which the catalyst is disposed in a reaction zone, and the hydrocarbons to be treated are passed therethrough in either upward, downward, or radial flow. The reaction zone effluent is generally fractionated to separate hydrogen and to recover the desired liquid products. As hereinbefore set forth, the hydrogen is recycled for further use in the process.

The following examples are introduced to illustrate further the novelty, utility, and mode of operation of the present invention, and the benefits to be derived through the utilization thereof. It is not intended to limit unduly the present invention to the specific conditions, method of catalyst manufacture, reagents or concentrations employed therein since these are to be regarded as illustrative rather than restrictive.

EXAMPLE I

This example evidences the increase in reforming process stability which is a singular characteristic of the present invention.

An alumina sol is prepared by digesting 99.99% pure aluminum metal in a dilute hydrochloric acid solution at an elevated temperature. During digestion magnetic purification is achieved by use of magnetic dross collectors on a slip stream. A small but significant removal of iron and copper from the solution is effected by this procedure. The purified alumina sol had a 2 p.p.m. iron content, by chemical analysis, based on weight of equivalent alumina in the sol. The raw sol is then blended with water and hydrochloric acid solution in order to obtain a sol having an Al/Cl ratio of 1.15 and a specific gravity of 1.3450. The sol is then aged for three days.

After aging, the sol is divided into five portions. Sufficient ferrous chloride is then added to four of the portions in order to obtain a concentration of 50 p.p.m. iron for portion B, 100 p.p.m. iron for portion C, 300 p.p.m. iron for portion D, and 600 p.p.m. iron for portion E. An aqueous solution containing hexamethylenetetraamine (HMT) is then prepared. An equal portion of this HMT solution is then mixed with each of the five portions of the alumina sol. The resultant solutions are then separately passed through a vibrating dropping head and dropped in discrete particles into a forming oil maintained at about 200° F. (see U.S. Patent No. 2,620,314 for additional details of this method). The dropped particles are then aged in the oil for a period of about 21 hours. The aged particles are thereafter transferred to a 2% ammonium hydroxide solution where they are aged at about 200° F. for 3 hours. The resultant spherical particles are subsequently water washed at about 200° F. for four hours to remove neutralization salts. The particles are finally oven dried and calcined at 1200° F. for four hours in an air atmosphere.

An impregnation solution containing chloroplatinic acid, in an amount sufficient to give about 0.375 weight to platinum on each catalyst, and hydrochloric acid, is added to the separate vessels containing the particles resulting from the different iron-alumina sols. The resultant platinum and chloride containing composites are then dried at a temperature of 190° F. to 220° F. for the purpose of removing excessive water remaining from the impregnation solution. Thereafter, the resultant particles are oxidized, or calcined, initially at a temperature within the range of from about 400° F. to about 600° F. for a period of about an hour. The calcination temperature is then increased to a level between about 900° F. to about 1000° F. and the catalytic composite is subjected to further oxidation at this temperature for about two hours.

The environments containing the various catalysts are then purged with nitrogen in order to remove substantially all oxygen. Thereafter, a stream of oxygen-free and sulfur-free hydrogen is passed over the catalysts for a period of about four hours at a temperature of about 900° F. to about 1100° F. After the reduction period, the catalysts are then subjected to a high temperature sulfiding treatment which involves passing a mixture of hydrogen and hydrogen sulfide, in which hydrogen sulfide is present in an amount of about 1 mole percent, at a temperature of about 1050° F. for a period of about two hours.

The quantitative results of the above procedure are given in Table I for the various catalysts of interest. It is to be noted that the catalyst type designation corresponds to the designation of the sol portions previously mentioned.

TABLE I.—COMPOSITION OF CATALYSTS

| Catalyst type | A | B | C | D | E |
| --- | --- | --- | --- | --- | --- |
| P.p.m. Fe added to Al$_2$O$_3$ | 0 | 50 | 150 | 300 | 600 |
| Wt. percent Pt | 0.341 | 0.375 | 0.375 | 0.375 | 0.375 |
| Wt. percent Cl | 0.64 | 0.71 | 0.70 | 0.67 | 0.70 |
| Wt. percent S | 0.11 | 0.13 | 0.11 | 0.08 | .10 |

These catalysts are then subjected to a series of identical standard accelerated evaluation tests for the purpose of evaluating their stability characteristics.

The charge stock that is utilized in this test is a light Kuwait naphtha having a 64.0° API gravity at 60° F., an initial boiling point of 175° F., an end boiling point of 275° F., a sulfur content of 1.6 p.p.m., less than 1 p.p.m. of nitrogen, and less than 2 p.p.m. of water. Furthermore, the charge stock is approximately 74% by volume paraffins, 19% by volume naphthenes and 7% by volume aromatics.

The flow scheme that is employed in this evaluation test consists of: passing the charge stock in admixture with recycle hydrogen over the catalyst to be evaluated which is situated in a reforming zone; withdrawing from the reforming zone a single product stream; passing this effluent stream through cooling means and into a separating zone; separating a hydrogen-rich gaseous phase from a hydrocarbon liquid phase; recycling a portion of the gaseous phase through compressive means to the reaction zone; passing the liquid phase from the separating zone to a fractionating zone; removing the light ends (i.e. $C_1$ to $C_4$) from this liquid phase in this fractionating zone; and recovering a $C_5^+$ reformate product stream from the bottom of this fractionation zone.

The test is carried out at accelerated condition designed to yield information on stability characteristics in a short period of time. These include: a liquid hourly space velocity of 1.5, a reactor pressure of 300 p.s.i.g., and a mol ratio of 12 moles of total recycle gas per mol of hydrocarbon charge. The test period is six days, the temperature being adjusted constantly throughout the test in order to attain a reformate having an octane number of 100 F–1 clear.

The results of the tests are summarized in Table II.

TABLE II.—RESULTS OF STABILITY TESTS

| Catalyst Type | 1st period | | 6th period | | Stability | |
|---|---|---|---|---|---|---|
| | Temp., °F. | $C_5$ yield | Temp., °F. | $C_5$ yield | ΔT | Δ$C_5^+$ yield |
| A | 980.5 | 66.88 | 1,003.0 | 64.63 | +22.5 | −2.25 |
| B | 987.0 | 67.37 | 1,004.5 | 65.46 | +17.5 | −1.91 |
| C | 985.5 | 67.28 | 1,001.5 | 65.84 | +16.0 | −1.44 |
| D | 987.0 | 67.14 | 999.0 | 66.15 | +12.0 | −0.99 |
| E | 988.5 | 66.33 | 999.5 | 65.01 | +11.0 | −1.32 |

From this table, it can be seen that as the iron level in the catalyst increased the stability parameters of reactor temperature differential and of $C_5^+$ vol. percent yield differential increased markedly. For instance for catalyst A, the temperature differential was −2.25 vol. percent; whereas for catalyst E, containing 600 p.p.m. iron, the corresponding numbers are +11.0° F. and −1.32 vol. percent. Likewise, it can be noted from the table that the yield differential starts to increase for the 600 p.p.m. iron (i.e. catalyst E) referenced to the 300 p.p.m. iron run (i.e. catalyst D) indicating an optimum level, for this platinum content, somewhere between these two values.

Accordingly, this example manifests the increase in stability of both reaction temperature and $C_5^+$ vol. percent yield that is characteristic of the present invention.

EXAMPLE II

A second series of the catalysts are manufactured in accordance with the method delineated in Example I with a slight modification in the concentration of the chloroplatinic acid used in order to study the present invention at higher levels of platinum content in the catalysts. The results of the catalyst preparation procedure are exhibited in Table III.

TABLE III.—COMPOSITIONS OF CATALYSTS

| Catalyst type | F | G | H | I |
|---|---|---|---|---|
| P.p.m. Fe added to $Al_2O_3$ | 0 | 150 | 300 | 600 |
| Wt. percent Pt | 0.75 | 0.75 | 0.75 | 0.75 |
| Wt. percent Cl | 0.71 | 0.75 | 0.73 | 0.76 |
| Wt. percent S | 0.10 | 0.10 | 0.10 | 0.11 |

These catalysts are then subjected in an evaluation procedure identical to that delineated in Example I. The results of this procedure are depicted in Table IV. From this table it can be seen that the effect of the iron incorporation at these higher platinum levels is approximately the same as observed in Example I. Consequently, the incorporation of a uniform distribution of iron in the alumina support has a market effect on stability parameter at both low and high platinum levels.

TABLE IV.—SUMMARY OF TEST RESULTS

| Catalyst Type | 1st period | | 6th period | | Stability | |
|---|---|---|---|---|---|---|
| | Temp., °F. | $C_5$ yield | Temp., °F. | $C_5$ yield | ΔT | $C_5^+$ yield |
| F | 981.5 | 67.96 | 1,003.5 | 66.23 | +22.0 | −1.73 |
| G | 979.0 | 67.33 | 1,002.0 | 66.14 | +23.0 | −1.19 |
| H | 982.5 | 66.50 | 999.0 | 65.90 | +17.0 | −0.60 |
| I | 984.0 | 66.91 | 999.5 | 66.72 | +15.5 | −0.19 |

I claim as my invention:

1. A process for reforming a hydrocarbon charge stock which comprises contacting said charge stock and hydrogen at reforming conditions with a catalytic composite containing a platinum group metallic component, a halogen component, an alumina component, a sulfur component, and an iron component which is uniformly distributed throughout said alumina component; said catalytic composite being further characterized in that it is prepared from purified alumina containing less than 20 p.p.m. of iron, in that an iron-containing compound is added in an amount such that the final composite contains about 50 p.p.m. to about 5000 p.p.m. by weight of iron, and in that said sulfur component is present in an amount of about 0.05% to about 0.5% by weight.

2. The process of claim 1 further characterized in that said hydrocarbon charge stock boils within the gasoline range.

3. The process of claim 1 further characterized in that said platinum group metallic component is platinum which is present in an amount of from about 0.01% to about 3.0% by weight of the composite.

4. The process of claim 1 further characterized in that said halogen component is selected from the group consisting of chlorine and fluorine and that it is present in an amount of iron from about 0.1% to about 2.0% by weight of the composite.

5. The process of claim 1 further characterized in that said iron-containing compound is an iron salt which is added to a purified alumina sol from which a carrier material for the other catalytic components is made.

6. The process of claim 1 further characterized in that said iron component is composited with the purified alumina component by impregnating with an iron salt after the alumina has been formed from an alumina sol.

7. The process of claim 1 further characterized in that said sulfur component is added after a high temperature reduction treatment of the sulfur-free catalytic composite.

8. The process of claim 1 further characterized in that said reforming conditions include a pressure of from about 50 p.s.i.g. to about 1000 p.s.i.g., a liquid hourly space velocity of from about 0.2 to about 20.0, a temperature of from about 800° F. to about 1100° F., and a mole ratio of hydrogen to charge stock of from about 0.5 to about 20.0.

9. The process of claim 1 further characterized in that said halogen component is chlorine.

References Cited

UNITED STATES PATENTS

| 2,863,825 | 12/1958 | Engel | 208—139 |
| 2,939,847 | 6/1960 | Smith et al. | 208—139 |
| 3,143,511 | 8/1964 | Bichard et al. | 208—139 |
| 3,224,962 | 12/1965 | Baldwin | 208—139 |

DELBERT E. GANTZ, *Primary Examiner.*

H. LEVINE, *Assistant Examiner.*